Patented Nov. 3, 1931

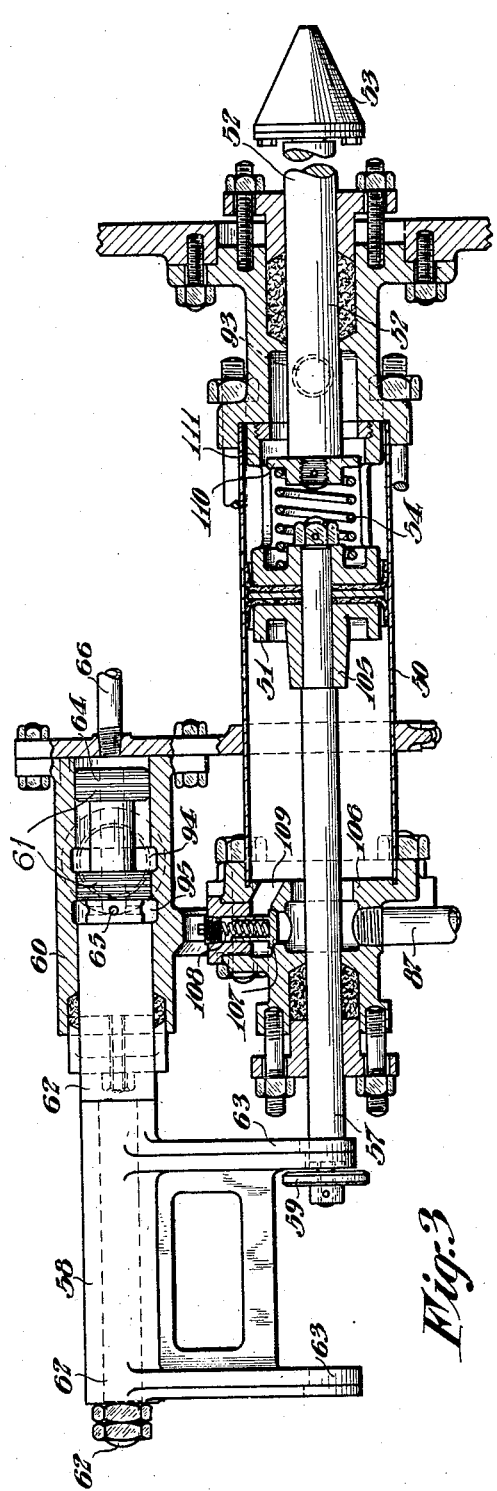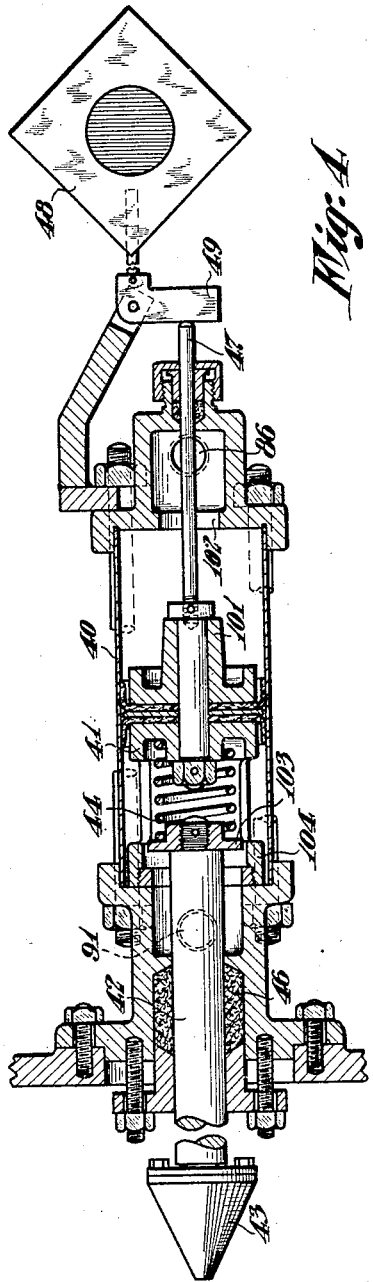

1,829,768

UNITED STATES PATENT OFFICE

THOMAS W. STONE, OF FORT WAYNE, INDIANA, ASSIGNOR TO THE WESTERN GAS CONSTRUCTION COMPANY, A CORPORATION OF INDIANA

HOT VALVE

Application filed March 15, 1929. Serial No. 347,272.

This invention relates to valves for handling gases in a highly-heated condition and relates more specifically to valves adapted for the exacting conditions found in water-gas generating plants.

Such plants operate on an intermittent cycle during one portion of which air is blown through a bed of fuel to highly heat the fuel and during another portion of the cycle steam is passed through the same bed of fuel to make blue gas or water gas. Each time the operation of the gas generator changes from one portion of the cycle to another portion, several valves must necessarily be opened and closed.

The valve forming the subject matter of this invention is intended primarily to be located on a waste heat boiler connection that conducts highly-heated gases during the air blow period of the cycle to a waste heat boiler and cuts off the flow of water gas to the waste heat boiler during the gas making portion of the cycle.

However, it is not intended that the use of the valve be limited to this one exact location, as with the many different arrangements of water-gas plants, other connections may require such a valve.

A further object of the invention is to entirely separate the action of a placement mechanism that moves the double discs to or from a position obstructing the straight-through opening of the valve from the action of a seating mechanism that presses the periphery of the discs against the seats of the valve with considerable force. That is, the seating can take place after the movement of the discs by the placement mechanism, for the purpose of closing the valve, has ceased.

During the opening of the valve, the seating mechanism loosens the discs from the seats before the placement mechanism starts to move. This mode of operation is different from and superior to the old way of having the placement mechanism move the discs not quite all the way across the opening and then having the seating mechanism derive the power or motion that is required to bring the discs into firm contact with the seats from the final or remaining motion of the placement mechanism.

This complete separation of the placing and seating functions makes possible a further improvement in the operation of these water-gas plant valves for it permits the use of separate hydraulic cylinders or other sources of power for the two functions and makes it possible to have safety interlocking devices that are exterior to and separate from the valve to prevent the placement and seating mechanisms from undergoing any simultaneous movements.

The safety interlock comprises one valve that is opened and closed by the placement mechanism and through which fluid that actuates the seating mechanism passes on its way to the cylinder. It also comprises a second valve that is opened and closed by the seating mechanism and through which fluid must pass on its way to the cylinder that actuates the placement mechanism. This arrangement obviates the necessity of having mechanical interlocking means, or having elements that serve a double function, located within the casing of the double disc valve.

In the drawings, Figure 1 is an elevation, in outline, showing the principal parts of a water-gas plant with the aforesaid valve placed in suitable relation to the rest of the plant;

Fig. 3 is a cross-section of a hydraulic cylinder shown in the upper left-hand portion of Fig. 2;

Fig. 4 is a hydraulic cylinder shown in the upper right-hand corner of Fig. 2;

Figure 1:
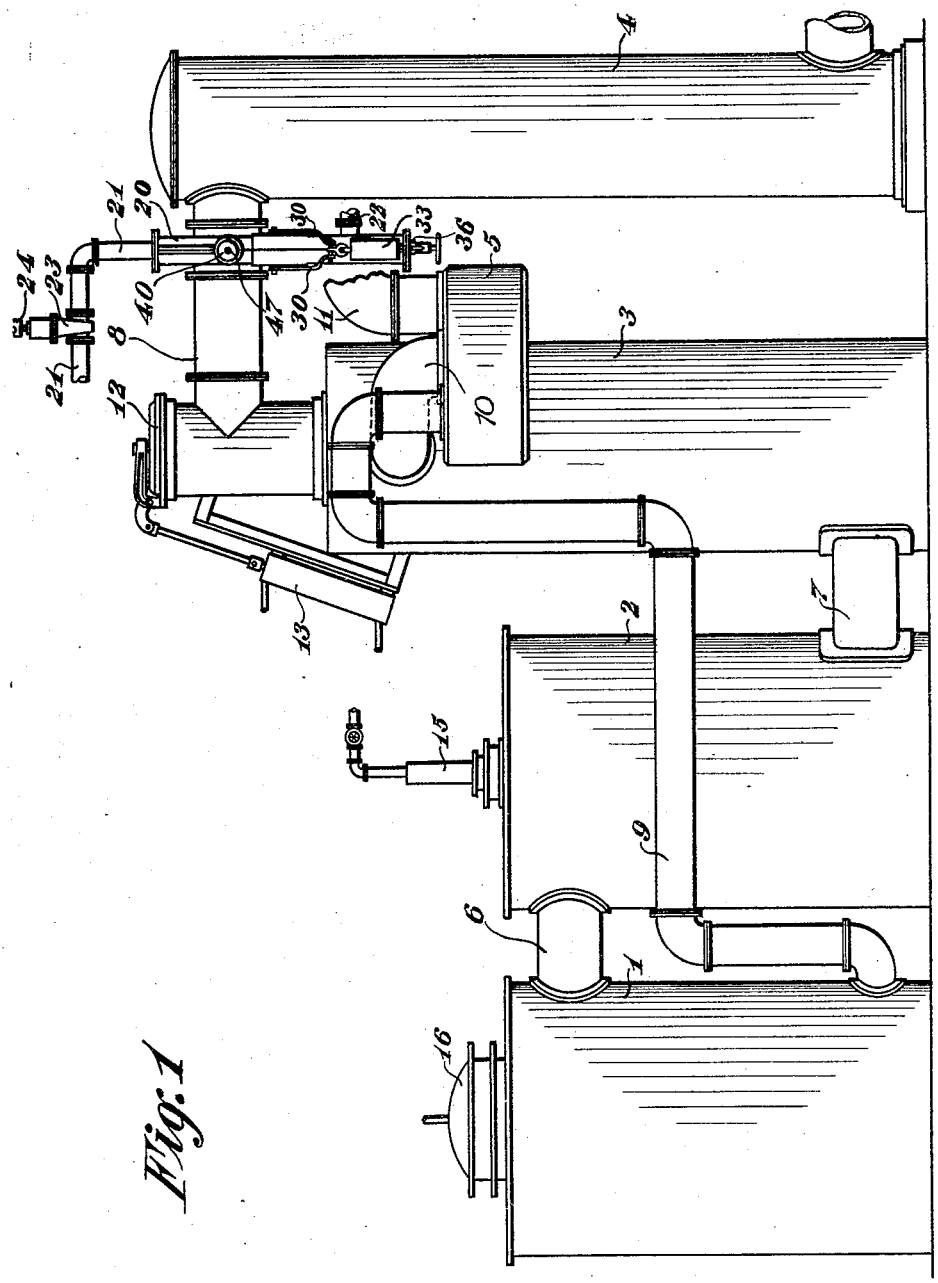

In Fig. 1 is a generator 1, a carburetter is shown at 2, a super-heater at 3, a waste heat boiler at 4 and a tar batter or wash box at 5. A top gas offtake 6 leads from the generator to the carburetter and a pipe 7 connects the carburetter to the super-heater. A waste heat boiler connection 8 leads from the top of the super-heater to the boiler.

A back-run pipe 9 conducts down-run gases from generator 1 to the wash box 5. A pipe 10 conducts up-run gases from the top of the super-heater to the wash box 5 which is provided with a gas main connection 11. During the blow periods of the cycle, the stack valve 12 is opened and a hydraulic cylinder 13 is provided for its operation. The carburetter 2 is provided with an oil spray 15 and the generator 1 is provided with the usual coaling door 16.

The valve which forms the subject matter of the present invention is shown in Fig. 1 as a waste heat valve 20 located on the waste heat boiler connection 8. It is provided with a low pressure steam inlet line 21 and an outlet for the steam at 22. A valve 23 controls the entrance of the steam to valve 20 and is operated by a hydraulic cylinder 24. It is by no means essential, however, that the valve casing be provided with cooling steam or circulating steam for ventilating purposes and these low pressure steam connections are omitted from the valve when it is intended for certain locations other than that suggested in Fig. 1.

Figure 2:
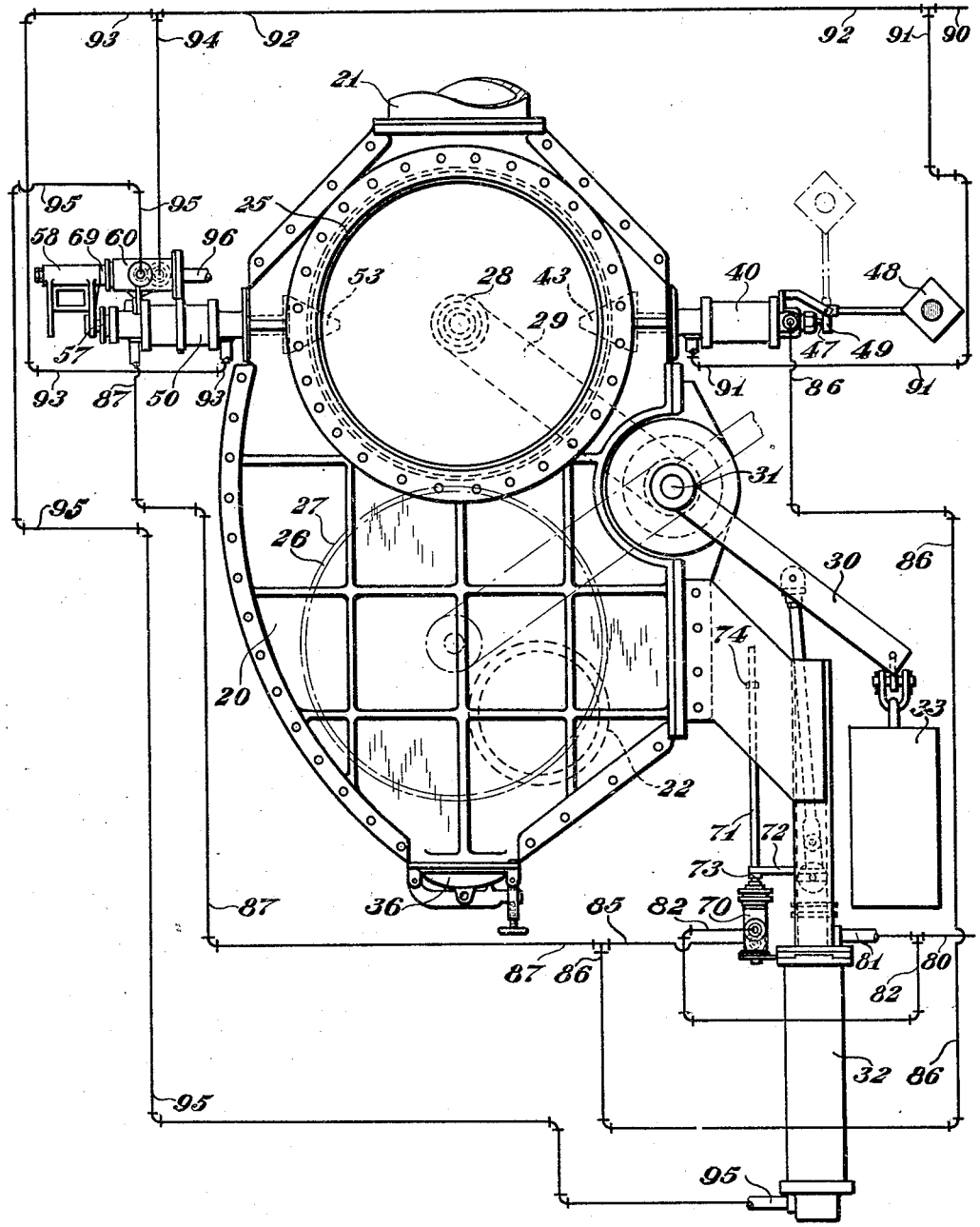
Fig. 2 is an elevation of the valve.

Referring to Fig. 2, the large valve casing 20 is provided with a large straight-through opening 25 adapted to be closed by discs 26, 27, shown in dotted lines within the lower portion of casing 20. The discs 26, 27 are mounted at the inner end 28 of the arm 29, the arm 29 having an exterior lever portion 30 that projects from the right-hand side of the casing as shown in Fig. 2. The arm 29 is pivoted at 31 and is operated by a hydraulic cylinder 32 and a weight 33.

Figure 5:
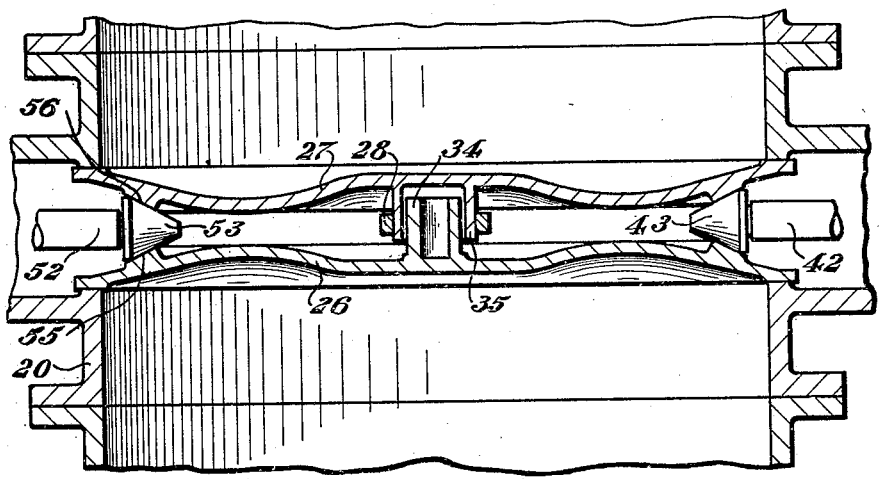
Fig. 5 is a cross-section in plan view through the center of the two discs, showing them pressed tightly against their seats in the main body of the valve.
Figure 6:
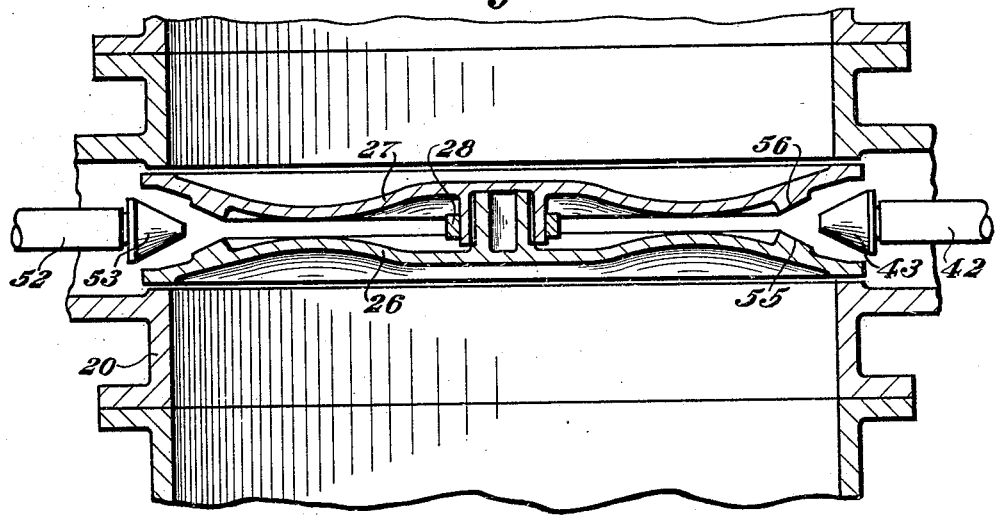
Fig. 6 is similar to Fig. 5 except that the two discs are loose from their seats.

The inner end 28 of the arm 29 is in the form of a ring and surrounds bushings 34 and 35 shown in Figs. 5 and 6 for supporting the discs 26 and 27.

A clean-out door 36 is provided at the bottom of casing 20.

A hydraulic cylinder 40, shown at the right of Fig. 2 and also shown enlarged in Fig. 4, contains a piston 41 which actuates the piston rod 42 that carries a conical wedge 43. This wedge, shown in Figs. 5 and 6, is capable of wedging disc 26 away from the disc 27. Should there be an obstruction on the seat of the valve so as to prevent the wedge 43 from making its normal length of stroke, the spring 44 located between piston 41 and piston rod 42 will prevent breakage. The piston rod 42 is provided with a stuffing gland 46 and there is a secondary piston rod 47 projecting from the opposite side of piston 41 which moves a visible signal 48 by means of an angular lever 49.

A cylinder 50, shown at the left of Fig. 2 and enlarged in Fig. 3, contains a piston 51 which actuates a piston rod 52 carrying a wedge cone 53 on its end that, as shown in Figs. 5 and 6, aids wedge cone 43 in pressing the double discs 26, 27 against their seats. An obstruction on the seats would not cause breakage, due to the presence of the spring 54 between piston 51 and piston rod 52.

The two cones 43 and 53 rotate freely on the ends of piston rods 42 and 52, respectively. They do not contact with unprotected parts of the valve discs 26 and 27, but contact with a rib 55 cast on the back of disc 26 and a rib 56 cast on the back of disc 27. These ribs are not provided with depressions to fit the cones 43 and 53, but have smooth faces and extend in complete circles continuously around discs 26 and 27 so as to make line contact with the cones 43 and 53.

A secondary piston rod 57 projects from the side of piston 51 opposite from rod 52 and actuates a large cross-head 58 by means of a button 59 on the end of the piston rod. A valve body 60 contains piston valve heads 61 pressed onto an enlarged piston rod or plunger 62 on which is mounted cross-head 58. The member 59, near the end of its stroke, will contact with either of two forks 63 and impart a small amount of motion to cross-head 58. It should be noted that plunger 62 is reduced at one end to project through cross-head 58 and at its other end is reduced to have piston valve heads 61 pressed on. The portion bearing the valve heads 61 has a small axial hole 64 drilled therethrough and moreover this axial hole 64 communicates with small cross drilled holes 65. A vent 66 prevents trapping of water at the right-hand end of piston heads 61.

A valve body 70, shown in the lower right-hand portion of Fig. 2, is provided with a long valve stem 71. An arm 72, carried by the piston rod of cylinder 32 and partaking of the movements of outer lever 30 of arm 29, slides up and down along valve stem 71 and, when near each end of its stroke, moves the valve stem by means of stops 73 and 74.

The operation of the valve proper is as follows:

In order to close the valve, fluid is passed to the upper end of cylinder 32, thereby depressing the outer end 30 of arm 29 and elevating the two discs 26, 27 to a position opposite the straight-through opening 25. After this motion is completed, a separate set of hydraulic cylinders 40 and 50 press wedges 43 and 53 in between the pair of discs, spreading them with considerable force against the valve seats in the interior of main valve casing 20.

To open the valve, water is supplies simultaneously to the inner ends of cylinders 40 and 50 to retract wedges 43 and 53 from between the discs, allowing the discs to loosen from their seats and be retracted toward each other sidewise. After this movement is completed, water is supplied to the bottom end of the cylinder 32, raising the outer lever 30 of arm 29 and moving the two discs edgewise into the bottom of casing 20 whereupon the straight-through opening 25 is entirely unobstructed.

The interlocking mechanism necessary to bring about the above sequence of motions and avoid breakage of parts by preventing both motions from taking place at the same time is as follows:

A pipe 80 leads to a distant automatic control mechanism (not shown) and branches into a pipe 81 that communicates with the top of cylinder 32 and into a pipe 82 that connects with the outer ends of cylinders 40 and 50 by means of pipes 85, 86 and 87.

A pipe 90, also connected to the distant automatic control, leads to the inner ends of cylinders 40 and 50 by means of pipes 91, 92 and 93. Pipe 90 also communicates with the bottom of cylinder 32 through pipes 92, 94 and 95.

When the set of pipes 80 to 87 are receiving pressure from the distant automatic control, the set of pipes 90 to 95 act as exhaust pipes. When pipes 90 to 95 have pressure applied by the automatic control, the set of pipes 80 to 87 exhaust water back to the automatic control.

Assume that the valve 20 is to be closed and that high pressure is applied to the pipe 80. This pipe divides into pipes 81 and 82, but the pipe 82 is closed at valve 70 since this valve has been closed by the previous opening of the main double disc valve. Pressure through 81 passes to the upper side of the piston in cylinder 32, depressing the piston, lowering lever 30 and elevating arm 29 with the two discs edgewise into a position to obstruct the straight-through opening 25.

The water beneath the piston in 32 is not trapped for it can pass freely out through pipe 95 as valve 60 is open at this time and the fluid exhausts through pipes 94, 92 and 90 back to the automatic hydraulic control. When cylinder 32 completes its stroke, arm 72 will engage stop 73 on the valve stem of valve 70 and open the latter. The water in pipe 82 will then flow through pipe 85 where it divides into pipes 86 and 87. Pipe 86 leads to the outer end of cylinder 40 and the piston 41 presses wedge 43 between the discs.

Pipe 87 is connected to the outer end of cylinder 50 and the wedge 53 is passed between the discs.

When wedge 53 and secondary piston 57 are completing the end of their stroke, the valve 60 is closed. This does not block the fluid flowing from the lower end of cylinder 32 because this cylinder has already completed its stroke and no more fluid is flowing from pipe 95 to pipe 94. Movement of the pistons in cylinders 40 and 50 has been possible because the inner end of cylinder 50 communicates through pipes 93, 92 and 90 with the hydraulic control for exhaust purposes and the inner end of cylinder 40 communicates through pipes 91 and 90 with the automatic control for exhaust purposes.

When the hydraulic control is adjusted to open the double disc valve, pipe 80 becomes an exhaust line and pressure is applied through pipe 90 to pipes 91 and 92. The cylinder 40 and piston 41 withdraw the conical wedge 43 and the pressure in pipe 92 extends through pipe 93 to the inner end of cylinder 50, thereby effecting the withdrawal of wedge 53. While these cylinders are acting, pressure is also transmitted to pipe 94, but has no effect because valve 60 under these circumstances is closed.

When cylinder 50 completes its stroke, withdrawing wedge 53, the secondary piston rod 57 engages fork 63, thereby moving crosshead 58 and piston valve 61, 61 to the left, establishing communication between pipes 94 and 95 and the water flows through pipe 95 to the bottom of cylinder 32, elevating lever 30 and moving the double discs 26, 27 edgewise from the opening 25. At the end of the stroke of cylinder 32, arm 72 engages stop 74, elevating valve stem 71 and closing the valve 70.

The closing of valve 70 stops the exhaust of water from pipes 87 and 86 through pipe 85 to pipe 82, but this does no harm since the cylinders 40 and 50 have already completed their strokes. Movement of the piston in cylinder 32 was possible, due to the fact that at its upper end pipe 81 communicates with the pipe 80 so as to exhaust back to the hydraulic control.

To avoid shock when the piston 41 approaches the end of its stroke at the right-hand end of cylinder 40, a cone 101 is carried at the right-hand side of piston 41, as shown in Fig. 4, and enters the internal flange 102, thereby establishing a restricted opening between the surface of cone 101 and the edge of flange 102. The farther the cone 101 travels to the right, the smaller becomes the restricted opening, thereby throttling the water flowing to port 86 and decelerating the piston gradually at the right-hand end of its stroke.

Should the cone 43 meet with some obstruction temporarily till the piston 41 had completed its stroke to the left, and thereby compress the spring 44 and should the obstruction then suddenly give way, the disc 103 attached to the end of the inner end of plunger 42, which is provided with edges that pass so close to the inner surfaces of the member 104 as to establish a restricted opening, would prevent the cone 43 from imparting any shock to the discs 26, 27. The member 104 by being rigidly attached to piston 41 also forms a cage for the spring 44.

Referring to Fig. 3, the disc 110 attached to the inner end of piston rod 52 and the inner surface of member 111 establish a restricted opening for the escaping water exactly corresponding to disc 103 and member 104 just described and prevent cone 53 from delivering any shock. The cone 105 and flange 106 slow down the piston 51 at the left-hand end of its stroke. When pressure is reapplied through pipe 87, all the water coming from 87 does not have to pass through the restricted opening to initiate movement of the piston 51, because the valve 107, held to its seat by spring 108, then lifts to establish communication through a large port 109.

The restricted openings established by parts 102 to 106, inclusive, are not the only portions of the device that tend to prevent breakage and incorrect operation. Nearly all parts of the device coact in some manner or are interconnected with some distant part to insure smooth operation. The cylinders that actuate the wedges that separate the discs cannot operate unless a valve under the control of the positioning lever arm is properly set. Neither can the lever arm be moved by the hydraulic cylinder connected thereto unless the valve on the supply pipe for this cylinder has been opened by a mechanical connection that leads to one of the wedges.

I claim as my invention:

1. In a connection for a water-gas plant having a valve with a straight-through opening, valve seats adjacent the opening and double discs adapted to obstruct the opening, the combination of a placement mechanism to move the discs to or from their obstructing positions, a separate seating mechanism for pressing the discs against the seats after the discs are positioned, said seating mechanism being mounted directly on the valve and supported independently of the placement mechanism and an interlocking device for preventing the simultaneous movement of the placement and seating mechanisms and for preventing operation of the seating mechanism except when the discs are positioned to obstruct the valve opening.

2. In a connection for a water-gas plant having a valve with a straight-through opening, valve seats adjacent the opening and double discs adapted to obstruct the opening, the combination of a placement mechanism for moving the discs to or from their obstructing positions and a separate seating mechanism for pressing the discs against the seats after the discs are positioned, said seating mechanism being mounted directly on the valve and supported independently of the placement mechanism, a hydraulic cylinder for actuating the placement mechanism, a pipe connected to the hydraulic cylinder, a valve on the pipe opened and closed by the seating mechanism, a second hydraulic cylinder for actuating the seating mechanism, a pipe connected to the second cylinder, and a valve on the last-named pipe that is opened and closed by movement of the positioning mechanism.

3. In a connection for a water-gas plant having a valve with a straight-through opening, valve seats adjacent the opening and double discs adapted to obstruct the opening, the combination of a placement mechanism for moving the discs to or from obstructing position and a separate seating mechanism for pressing the discs against the seats after the discs are positioned, said seating mechanism deriving its support entirely from the valve and said seating mechanism comprising hydraulic cylinders with piston rods arranged radially with respect to said discs, the piston rods bearing wedges adapted to enter between the discs.

4. In a connection for a water-gas plant having a valve with a straight-through opening, valve seats adjacent the opening and double discs adapted to obstruct the opening, the combination of a positioning hydraulic cylinder to move the discs edgewise to or from the obstructing position and entirely separate wedging cylinders arranged radially with respect to the discs and adapted to force wedges between the peripheries of the discs after the discs are in obstructing position, a control tube leading to the positioning hydraulic cylinder and a valve on the control tube opened and closed by the movement of the wedges, a control tube leading to the wedging cylinders and a valve on the last named tube that is opened and closed by movement of the discs to or from obstructing position.

5. In a connection for heated gases in a water-gas plant, the combination of a valve with a straight-through opening, valve seats adjacent the opening and double discs adapted to obstruct the opening, said valve having a placement mechanism to move the discs to or from the obstructing position and a seating mechanism capable of tightening the discs against or releasing them from the seats while the placement mechanism is at rest, an interlocking device under the control of the seating mechanism to prevent movement of the positioning mechanism and an interlocking device under the control of the positioning mechanism to prevent movement of the seating mechanism.

6. In a connection for heated gases in a water-gas plant, the combination of a valve with a straight-through opening, valve seats adjacent the opening and double discs adapted to obstruct the opening, said valve having a placement mechanism for moving the discs to or from the obstructing position and a seating mechanism capable of tightening the discs against or releasing them from the seats while the placement mechanism is at rest, an interlocking device under the control of the seating mechanism for preventing movement of the positioning mechanism while the discs are tight against the seats and a second interlocking device under the control of the positioning mechanism for preventing movement of the seating mechanism except when the discs are in obstructing position.

7. In a connection for a water-gas plant having a valve with a straight-through opening, valve seats adjacent the opening and double discs adapted to obstruct the opening, the combination of a placement mechanism for moving the discs to or from obstructing position and an independent seating mechanism for pressing the discs against the seats after the discs are positioned, said seating mechanism comprising hydraulic cylinders with piston rods arranged radially with respect to said discs, the piston rods bearing conical wedges adapted to enter between the discs and the discs having circular ribs on their backs to receive the thrust of the conical wedges.

8. Water-gas apparatus comprising a pipe having a valve opening, a gate valve of the double disc type having a reciprocating mechanism connected to a central portion of said valve for placing the discs in a suitable position to obstruct said valve opening, and a second reciprocating mechanism for engaging edge portions of said discs to seat them against the valve interior after they are in position.

9. Water-gas apparatus comprising a pipe having an opening, valve seats adjacent the opening and double discs adapted to close the opening, mechanism for positioning the double discs across the opening and a second and separate mechanism movable at substantially right angles to the first mechanism for pressing the discs against the seats after the discs are positioned.

10. Water-gas apparatus comprising a valve having an opening, valve seats adjacent the opening, double discs adapted to obstruct the opening, a placement mechanism for moving the discs to or from obstructing position and a separate seating mechanism for pressing the discs against the seats after the discs are positioned, said seating mechanism comprising movable wedge members adapted to force them apart by contact with their peripheries.

11. Water-gas apparatus comprising a pipe having an opening, valve seats adjacent the opening, double discs adapted to obstruct the opening, a placement mechanism for moving the discs to or from obstructing position and a separate seating mechanism for pressing the discs against the seats after the discs are positioned, said seating mechanism comprising a plurality of wedges radially movable with respect to said discs and adapted to force the discs apart by contact with their peripheries.

In testimony whereof, I have hereunto subscribed my name this 13th day of March, 1929.

THOMAS W. STONE.